US010500121B2

(12) United States Patent
Triolo et al.

(10) Patent No.: US 10,500,121 B2
(45) Date of Patent: Dec. 10, 2019

(54) MECHANICAL SELF-LEVELING WALKER

(71) Applicant: United States Department of Veterans Affairs, Washington, DC (US)

(72) Inventors: Ronald J Triolo, Cleveland Heights, OH (US); Kevin M Foglyano, Lakewood, OH (US)

(73) Assignee: The United States Government as Represented by the Department of Veterans Affairs, Washington, DC (US)

( * ) Notice: Subject to any disclaimer, the term of this patent is extended or adjusted under 35 U.S.C. 154(b) by 0 days.

(21) Appl. No.: 16/042,343

(22) Filed: Jul. 23, 2018

(65) Prior Publication Data
US 2019/0021935 A1 Jan. 24, 2019

Related U.S. Application Data

(60) Provisional application No. 62/536,410, filed on Jul. 24, 2017.

(51) Int. Cl.
*A61H 3/00* (2006.01)
*F16C 1/16* (2006.01)

(52) U.S. Cl.
CPC ......... *A61H 3/00* (2013.01); *A61H 2003/001* (2013.01); *A61H 2201/0192* (2013.01); *F16C 1/16* (2013.01)

(58) Field of Classification Search
CPC .... A61H 3/00; A61H 3/04; A61H 2201/0192; A61H 2003/001
USPC ................ 135/65–67, 85, 75; 482/75–76, 52
See application file for complete search history.

(56) References Cited

U.S. PATENT DOCUMENTS

| | | | | |
|---|---|---|---|---|
| 3,455,313 A | * | 7/1969 | King | A61H 3/00 135/67 |
| 5,349,977 A | * | 9/1994 | Wood | A61H 3/00 135/67 |
| 5,649,558 A | * | 7/1997 | Richard | A61H 3/00 135/67 |
| 5,787,913 A | * | 8/1998 | Li | A61H 3/00 135/67 |

(Continued)

OTHER PUBLICATIONS

Young, Lee; International Search Report from counterpart International Patent Application No. PCT/US2018/043282; dated Oct. 11, 2018, pp. 1-2, United States Patent and Trademark Office as Searching Authority, Alexandria, Virginia USA.

(Continued)

*Primary Examiner* — Winnie Yip
(74) *Attorney, Agent, or Firm* — Ballard Spahr LLP

(57) ABSTRACT

A walker for maintaining balance and stability has extendable and retractable struts positioned within tubular legs for leveling the walker when climbing stairs, a curb or an incline. The struts on each side of the walker are connected to one another via cables which coordinate the motion of the struts so that when the front struts retract within their respective tubular legs the rear struts extend proportionally and vice versa. The cables may be arranged using pulleys mounted within the tubular legs or Bowden cables may be used within each of the tubular legs. User actuated clutches engage the cables to arrest the motion of the struts and temporarily fix them in a desired configuration.

15 Claims, 5 Drawing Sheets

(56) References Cited

U.S. PATENT DOCUMENTS

| | | | |
|---|---|---|---|
| 6,145,524 A * | 11/2000 | Li | A61H 3/00 135/67 |
| 6,453,921 B1 * | 9/2002 | Rost | A61H 3/00 135/67 |
| 7,294,094 B1 * | 11/2007 | Howle | A61H 3/00 135/67 |
| 8,820,338 B1 | 9/2014 | Catricala et al. | |
| 9,119,757 B2 * | 9/2015 | Triolo | A61H 3/00 |
| 9,358,175 B2 * | 6/2016 | Bordan | A61H 3/00 |
| 9,545,354 B1 * | 1/2017 | Klausmeyer | A61H 3/00 |
| 9,775,767 B1 | 10/2017 | Khaligh | |
| 9,839,570 B2 * | 12/2017 | O'Sullivan | A61H 3/04 |
| 2012/0298160 A1 * | 11/2012 | Hamilton | A61H 3/00 135/66 |
| 2013/0061892 A1 | 3/2013 | Huang | |
| 2013/0180557 A1 | 7/2013 | Triolo et al. | |
| 2014/0109944 A1 | 4/2014 | Triolo et al. | |
| 2014/0261591 A1 * | 9/2014 | Velarde | A61H 3/00 135/67 |
| 2015/0320631 A1 | 11/2015 | Bordan | |

OTHER PUBLICATIONS

Young, Lee; Written Opinion from counterpart International Patent Application No. PCT/US2018/043282; dated Oct. 11, 2018, pp. 1-4, United States Patent and Trademark Office as Searching Authority, Alexandria, Virginia USA.

Nottingham Spirk, "Self Leveling Walker: Cleveland VA Hosptial," Aug. 31, 2017, Video found at https://vimeo.com/231878098.

* cited by examiner

MECHANICAL SELF-LEVELING WALKER

CROSS REFERENCE TO RELATED APPLICATIONS

This application is based upon and claims priority to U.S. Provisional Application No. 62/536,410, filed Jul. 24, 2017 and hereby incorporated by reference.

FIELD OF THE INVENTION

This invention relates to walkers for assisting people needing additional support to maintain balance and stability.

BACKGROUND

Walkers, comprising light-weight tubular frames which form pairs of opposed legs joined in parallel spaced relation are in widespread use to assist those in need of support to better maintain stability and balance while walking or standing. A user stands between the leg pairs and grips the tubular frame, placing weight on the legs while standing or pushing the walker while walking. Conventional walkers are suited for traversing level ground and have legs of substantially equal length. However, when climbing stairs, a curb or an incline such walkers cannot provide reliable support to the user, who is thus vulnerable to injury from a fall due to loss of balance. There is clearly a need for an improved walker which will allow traversal of stairs, curbs and inclines with greater safety.

SUMMARY

The invention concerns a walker for maintaining balance and stability of a user. In one example embodiment the walker comprises a first leg pair and a second leg pair. A cross beam connects the first and second leg pairs in parallel, space apart relation. Each leg pair comprises a U-shaped tube defining a front leg and a rear leg. A front strut is telescopically movable within the front leg and extends outwardly therefrom, and a rear strut is telescopically movable within the rear leg and extends outwardly therefrom. A front pulley is rotatably mounted within the front leg proximate to an end thereof, and a rear pulley is rotatably mounted within the rear leg proximate to an end thereof. An action cable is positioned within the tube and has a first end attached to the front strut and a second end attached to the rear strut. The action cable engages the front and rear pulleys in a serpentine fashion such that when the front strut moves into the front leg the rear strut moves outwardly from the rear leg and vice versa. A retaining cable is positioned within the tube and has a first end attached to the front strut and a second end attached to the rear strut.

By way of example each leg pair may further comprise a front idler pulley rotatably positioned within the front leg proximate a bend therein and a rear idler pulley rotatably positioned within the rear leg proximate a bend therein. The action cable engages the front and rear idler pulleys. Additionally, the retaining cable may also engage the front and rear idler pulleys.

In an example embodiment at least one of the leg pairs may further comprises a clutch mounted thereon. The clutch is actuatable by the user to engage the action cable for preventing motion of the front and the rear struts of the at least one leg pair. Also by way of example, each leg pair may further comprises a clutch mounted thereon, each clutch being actuatable by the user to engage the action cable for preventing motion of the front and the rear struts of the leg pairs. In an example embodiment each leg pair may further comprise a cross brace extending between the front and rear legs. Also by way of example, each leg pair may further comprise a front bearing acting between the front strut and the front leg and a rear bearing acting between the rear strut and the rear leg. The bearings facilitate motion of the struts relatively to the legs. In a specific example embodiment the bearings comprise linear bearings.

Another example embodiment of a walker for maintaining balance and stability of a user comprises a first leg pair, a second leg pair and a cross beam connecting the first and second leg pairs in parallel, space apart relation. By way of example each leg pair comprises a U-shaped tube defining a front leg and a rear leg. A front strut is telescopically movable within the front leg and extends outwardly therefrom, and a rear strut is telescopically movable within the rear leg and extends outwardly therefrom. A cable is positioned within the tube and a linear bearing is fixedly attached to the tube. The cable engages the linear bearing. A first end of the cable is attached to the front strut and a second end of the cable is attached to the rear strut such that when the front strut moves into the front leg the rear strut moves outwardly from the rear leg and vice versa. In a specific example embodiment the linear bearing comprises a Bowden cable. The Bowden cable comprises a sleeve fixedly attached to the tube. The cable extends through the sleeve. The first end of the cable is attached to the front strut and the second end of the cable is attached to the rear strut such that when the front strut moves into the front leg the rear strut moves outwardly from the rear leg and vice versa.

Further by way of example, at least one of the leg pairs further comprises a clutch mounted thereon. The clutch is actuatable by the user to engage the cable for preventing motion of the front and the rear struts of the at least one leg pair. In another example embodiment, each leg pair may further comprise a clutch mounted thereon. The clutches are actuatable by the user to engage the cables for preventing motion of the front and the rear struts of the leg pairs.

In an example embodiment, each leg pair may further comprise a cross brace extending between the front and rear legs. Further by way of example, each leg pair may further comprise a front bearing acting between the front strut and the front leg and a rear bearing acting between the rear strut and the rear leg. The bearings facilitate motion of the struts relatively to the legs. In a specific example embodiment the bearings comprise linear bearings.

DETAILED DESCRIPTION

Figure 1:
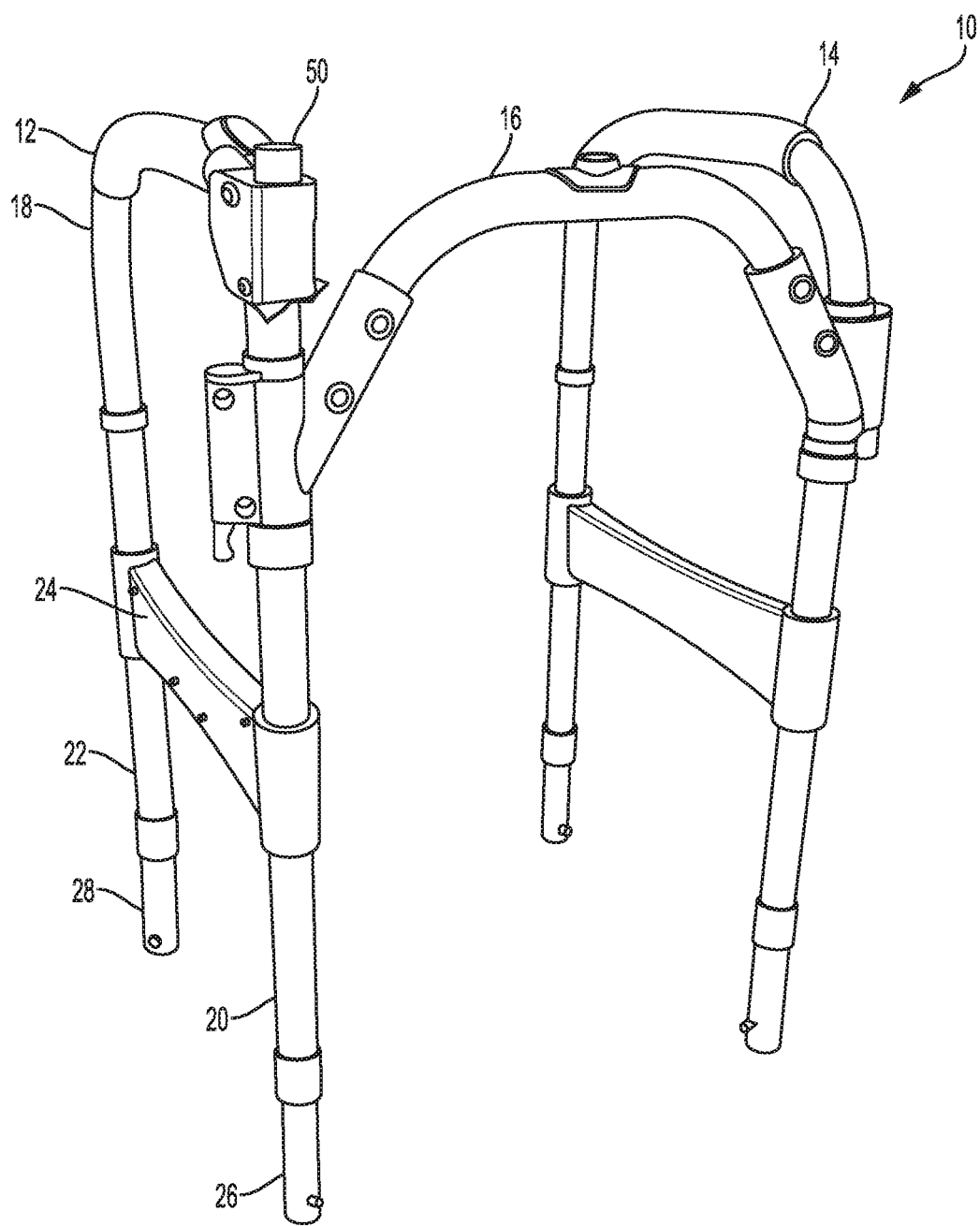
FIG. 1 is an isometric view of an example walker according to the invention.

FIG. 1 shows an example embodiment of a mechanical self-leveling walker 10 according to the invention. Walker 10 comprises first and second leg pairs 12 and 14 arranged opposite one another in parallel, space apart relation. A cross beam 16 fixedly connects the leg pairs to one another in this configuration to form a stable frame structure.

Figure 1A:
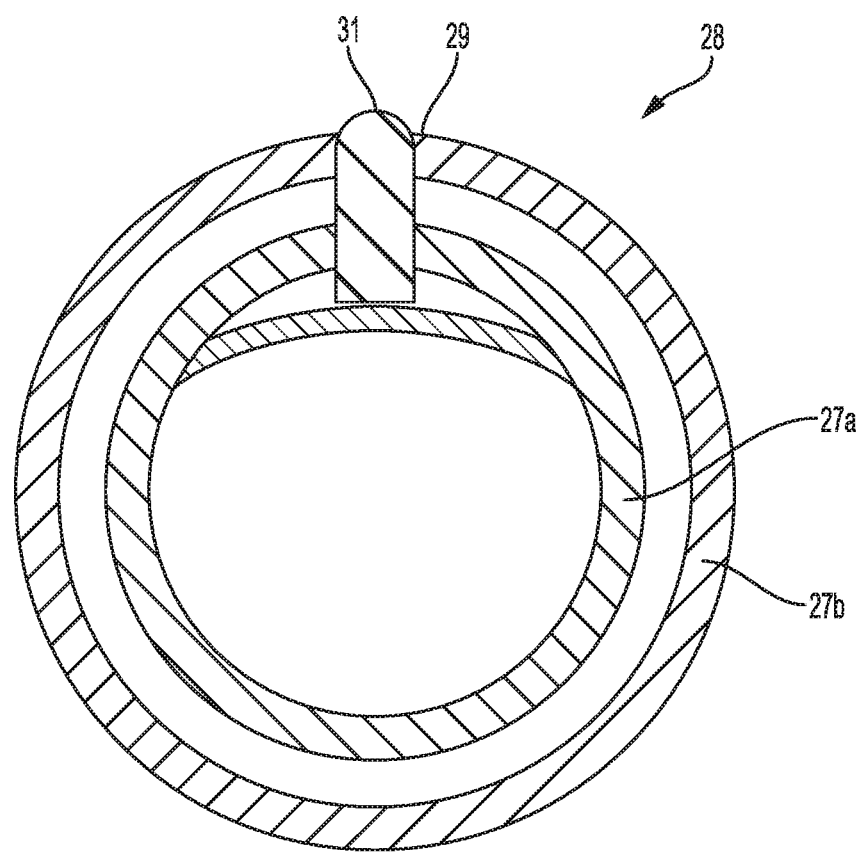
FIG. 1A is a cross sectional view of a component of the walker shown in FIG. 1.
Figure 2:
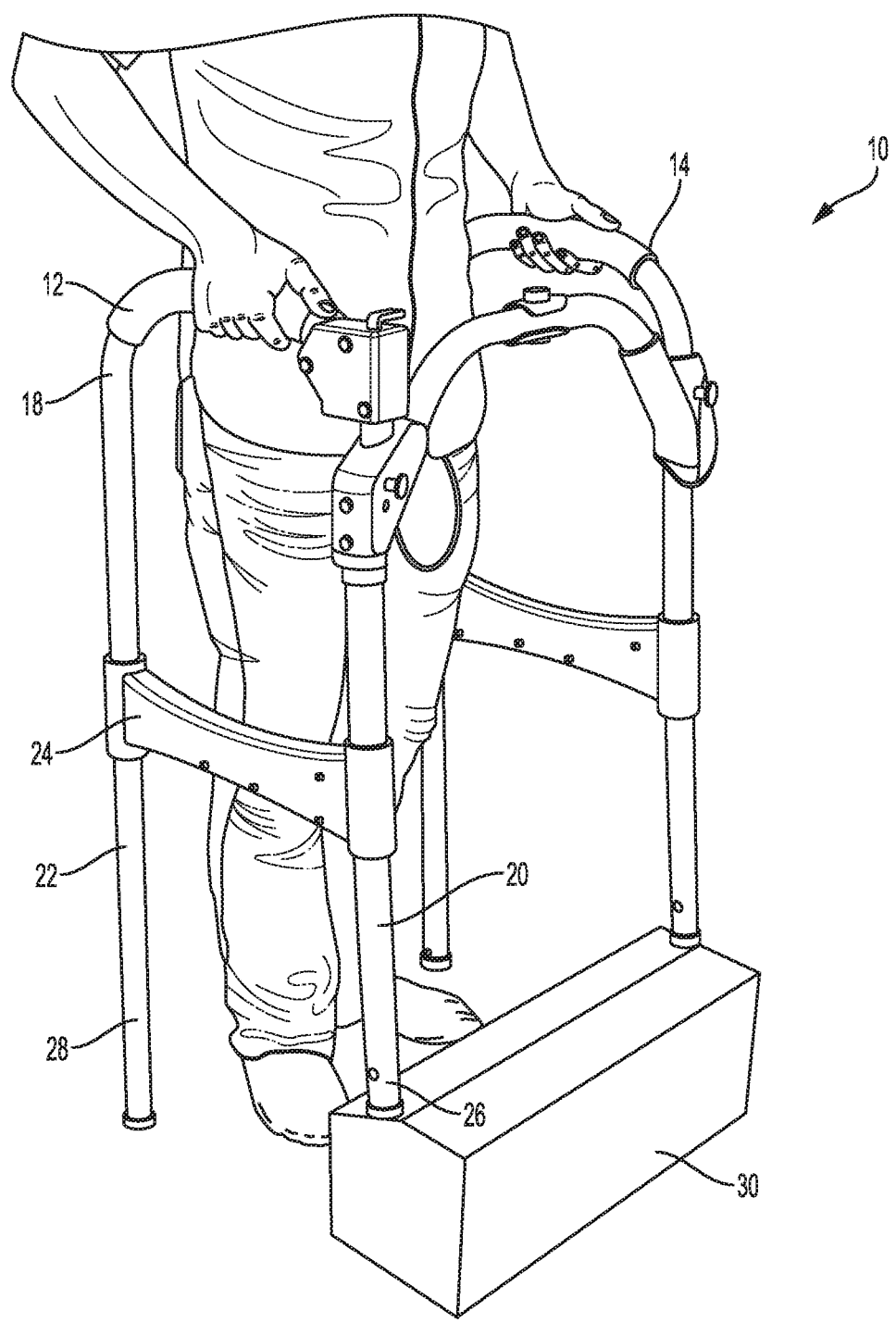
FIG. 2 is an isometric view of the walker shown in FIG. 1 being used to ascend a curb.

Each leg pair 12 and 14 comprises a U-shaped tube 18 which defines a front leg 20 and a rear leg 22. A cross brace 24 may extend between the front and rear legs 20 and 22 for added structural integrity. A front strut 26 is positioned within the front leg 20 and is telescopically movable relatively thereto. A rear strut 28 is similarly positioned within the rear leg 22 and is movable relatively thereto. The front and rear struts extend outwardly from their respective tubular legs 20 and 22 and provide infinite variability of length to the legs which permits the walker 10 to accommodate stairs, curbs and inclines. Struts 26 and 28 may also be individually adjustable by making them a tube 27a within a tube 27b as shown in the strut cross section of FIG. 1A (strut 28 shown). In this embodiment the outer tube 27b has a plurality of openings 29 arranged in lengthwise spaced relation along the outer tube which receive a spring biased detent 31 mounted on the inner tube 27a. Engagement between the detent 31 and a selected opening 29 in each strut permits manual overall height adjustment of the walker 10 for individual users. Operation of the walker is shown in a comparison of FIGS. 1 and 2. FIG. 1 shows the struts 26 and 28 extended in equal length from their respective legs 20 and 22 as would be for traversing level ground. FIG. 2 shows the front struts 26 of each leg pair 20, 22 retracted and the rear struts 28 extended for ascending a curb 30 or stairs (not shown).

Figure 3:
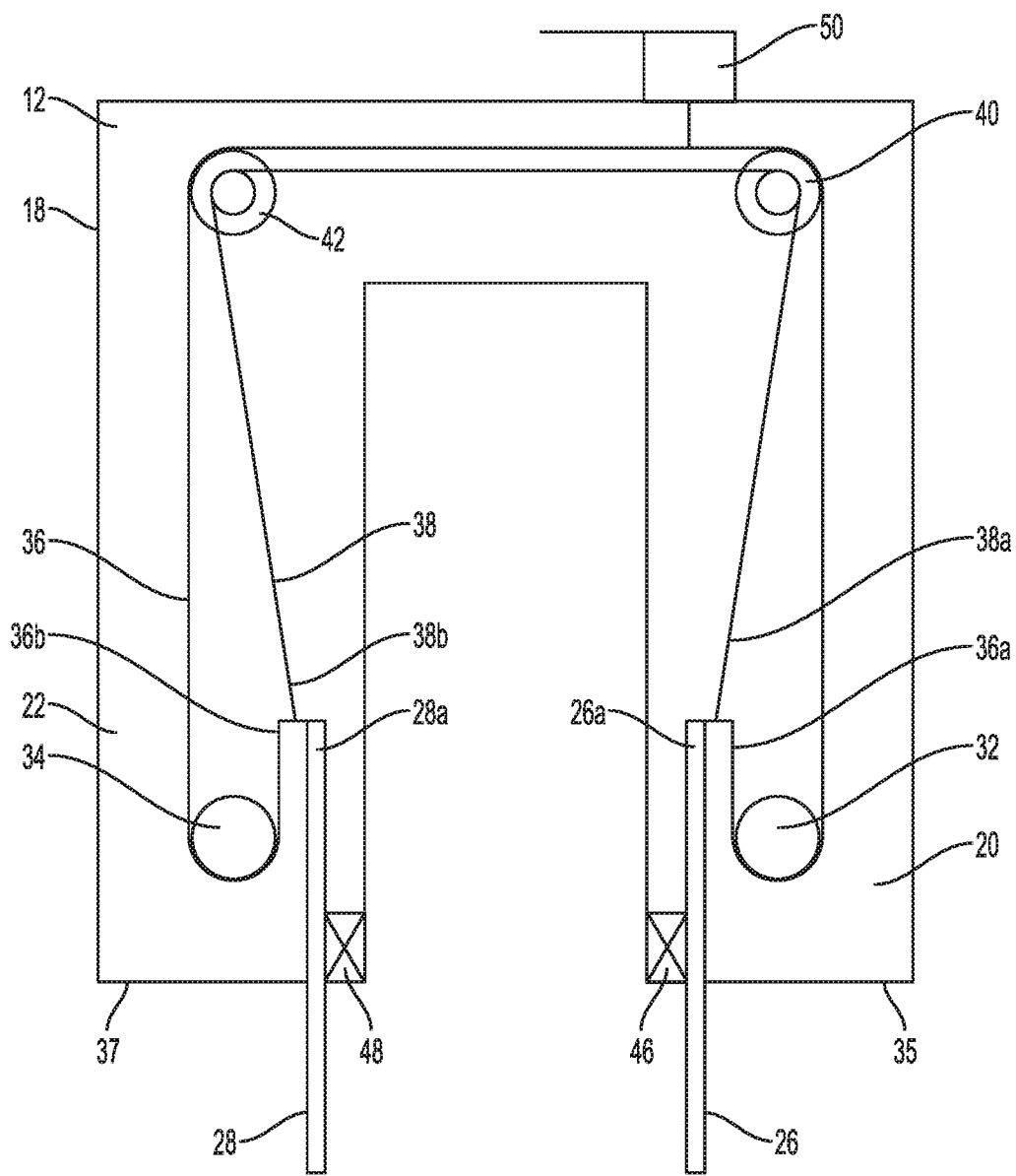
FIG. 3 is a schematic view of an example cable-pulley system usable within the walker of FIG. 1.

In one example embodiment, coordinated extension and retraction of the struts 26 and 28 is afforded by a pulley and cable system housed within each U-shaped tube 18. As shown in FIG. 3, the pulley and cable system comprises a front pulley 32 rotatably mounted within the front leg 20. Similarly, a rear pulley 34 is rotatably mounted within the rear leg 22. The mounting position of pulleys 32 and 34 is proximate to the respective ends 35 and 37 of the legs 20 and 21. Note that the ends 26a and 28a of the front and rear struts 26 and 28 are positioned farther within their respective legs 20 and 22 than the pulleys 32 and 34 are positioned. This relative positioning of the strut ends 26a and 28a and the pulleys 32 and 34 permit coordinated movement of the struts 26 and 28 as described below.

An action cable 36 is positioned within each U-shaped tube 18. A first end 36a of action cable 36 is attached to the front strut 26 and a second end 36b of the action cable is attached to the rear strut 28. Action cable 36 also engages the front and rear pulleys 32 and 34. Due to the aforementioned positions of the strut ends 26a and 28a relative to the front and rear pulleys 32 and 34 the action cable 36 wraps around the pulleys in a serpentine fashion. This arrangement of action cable 36, pulleys 32 and 34 and struts 26 and 28 within each U-shaped tube 18 ensures that when the front struts 26 move into their respective front legs 20 (as shown in FIG. 2) the rear struts 28 moves outwardly from the rear legs and vice versa. The motion of the front and rear struts 26 and 28 are proportional so as to maintain the walker 10 level when ascending stairs or a curb 30.

As further shown in FIG. 3 a retaining cable 38 is also positioned within the U-shaped tube 18. A first end 38a of retaining cable 38 is attached to the front strut 26 and a second end 38b of the retaining cable is attached to the rear strut 28. The retaining cable 38 maintains a fixed distance between the struts 26 and 28 and retains them in their respective legs 20 and 22 when the walker 10 is lifted off of the ground.

This example embodiment further comprises a front idler pulley 40 and a rear idler pulley 42. Idler pulleys 40 and 42 are rotatably mounted respectively within the front leg 20 and the rear leg 22 of the U-shaped tube 18, advantageously proximate the bend 44 in the tube. When the idler pulleys 40 and 42 are present, either or both the action cable 36 and the retaining cable 38 will engage them. The idler pulleys 40 and 42 lower the frictional resistance of the cables 36 and 38 which would otherwise occur as the cables slide within the U-shaped tube 18. Additional friction reduction is obtained by using front and rear bearings 46 and 48 between the front and rear struts 26 and 28 and the front and rear legs 20 and 22 respectively. Linear bearings are advantageously employed in this instance.

Motion of the struts 26 and 28 is controlled in this example by one or more clutches 50 mounted on the leg pairs 12 and 14 (see FIGS. 1 and 3). Clutch or clutches 50 are manually actuated by the user of walker 10 and engage the action cable 36 to prevent cable motion and thereby hold the struts 26 and 28 in a desired position when traversing stairs, a curb or an incline. Simple lever actuated jaws which grip the cable are one example of a clutch 50. The levers may be locked in place using a detent mechanism, which also allows the levers to be readily unlocked to again adjust the struts positions.

Figure 4:
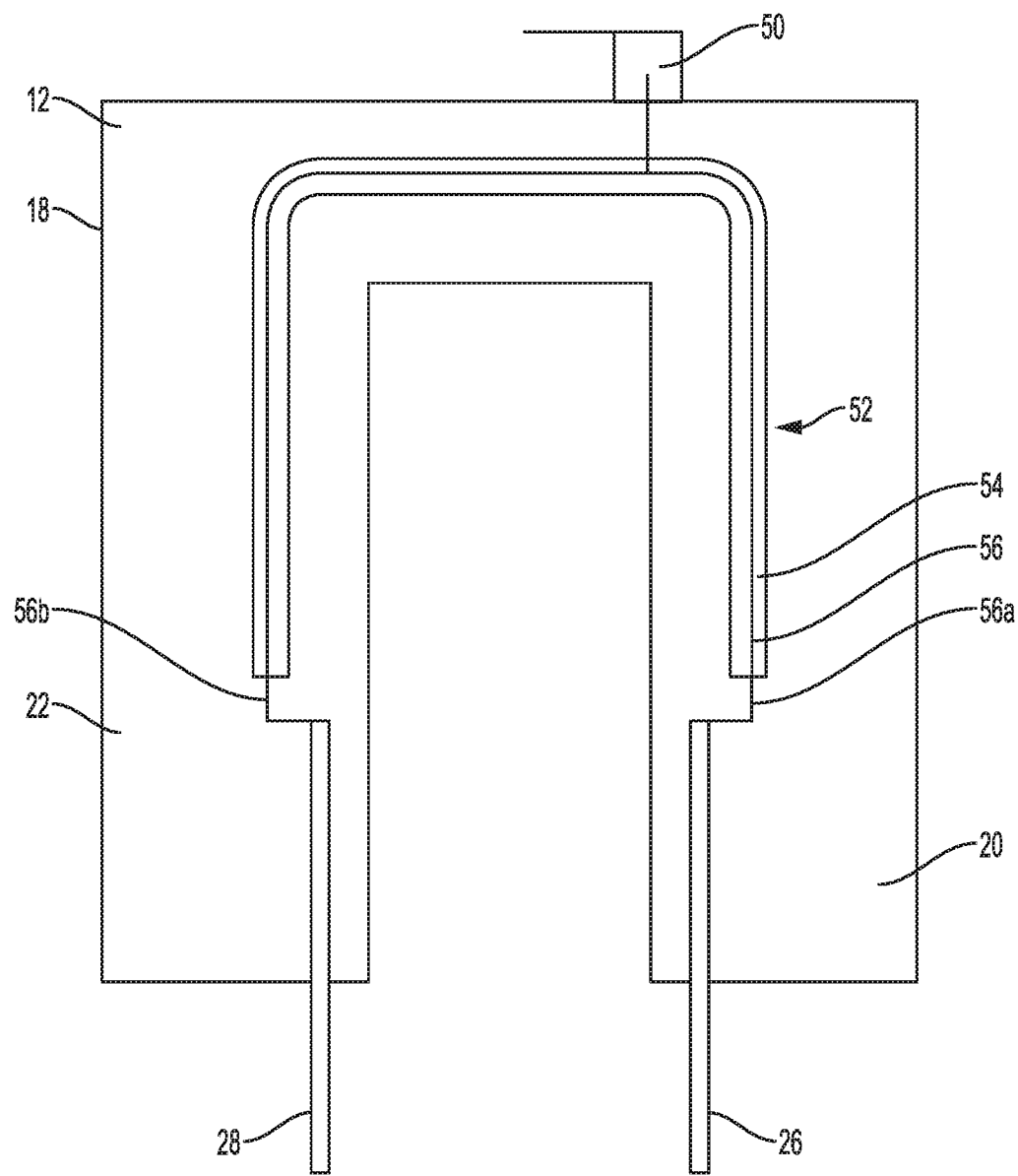
FIG. 4 is a schematic view of another example cable system usable within the walker of FIG. 1.

FIG. 4 shows an example embodiment of a cable system which uses a Bowden cable 52 to coordinate motion of struts 26 and 28 in each leg 20, 22 of the U-shaped tubes 18. Bowden cable 52 comprises a sleeve 54 fixedly attached within the U-shaped tube 18. A cable 56 extends through sleeve 54 and has a first end 56a attached to the front strut 26 and a second end 56b attached to the rear strut 28. The Bowden cable is advantageously used because it permits compressive forces to be borne by the cable 56, which is prevented from buckling by the fixed sleeve 54. Thus compression force applied to the front struts 26 will cause them to retract within their respective front legs 20 and the cable, being a Bowden cable, will transmit the force to the rear struts 28, which will extend proportionally from their respective rear legs 22 and allow the walker 10 to accommodate stairs or a curb, as shown in FIG. 2. Clutches 50 may again be used to engage the cable 56 and hold the struts 26 and 28 in the desired position while ascending.

Walkers 10 according to the invention are advantageously constructed from robust materials, such as aluminum and plastic, which have relatively high strength to weight ratios.

Mechanical walkers 10 according to the invention are expected to provide a safer means for traversing stairs, curbs and inclines as compared with walkers according to the prior art. Mechanical walkers have the advantage of simplicity over hydraulic systems and do not require motors, batteries, valves, electronics or gas or metal springs. Mechanical walkers according to the invention are infinitely and continuously adjustable to any practical height and not locked into pre-set increments, affording great versatility to the design.

What is claimed is:

1. A walker for maintaining balance and stability of a user, said walker comprising:
  a first leg pair;
  a second leg pair;
  a cross beam connecting said first and second leg pairs in parallel, space apart relation, wherein each said leg pair comprises:
   a U-shaped tube defining a front leg and a rear leg;
   a front strut telescopically movable within said front leg and extending outwardly therefrom;
   a rear strut telescopically movable within said rear leg and extending outwardly therefrom;

a front pulley rotatably mounted within said front leg proximate to an end thereof;
a rear pulley rotatably mounted within said rear leg proximate to an end thereof;
an action cable positioned within said tube and having a first end attached to said front strut and a second end attached to said rear strut, said action cable engaging said front and rear pulleys in a serpentine fashion such that when said front strut moves into said front leg said rear strut moves outwardly from said rear leg and vice versa;
a retaining cable positioned within said tube and having a first end attached to said front strut and a second end attached to said rear strut.

2. The walker according to claim 1, wherein each said leg pair further comprises:
a front idler pulley rotatably positioned within said front leg proximate a bend therein;
a rear idler pulley rotatably positioned within said rear leg proximate a bend therein; wherein
said action cable engages said front and rear idler pulleys.

3. The walker according to claim 2, wherein said retaining cable engages said front and rear idler pulleys.

4. The walker according to claim 1, wherein at least one of said leg pairs further comprises a clutch mounted thereon, said clutch being actuatable by said user to engage said action cable for preventing motion of said front and said rear struts of said at least one leg pair.

5. The walker according to claim 1, wherein each said leg pair further comprises a clutch mounted thereon, said clutch being actuatable by said user to engage said action cable for preventing motion of said front and said rear struts of said leg pairs.

6. The walker according to claim 1, wherein each said leg pair further comprises a cross brace extending between said front and rear legs.

7. The walker according to claim 1, wherein each said leg pair further comprises:
a front bearing acting between said front strut and said front leg; and
a rear bearing acting between said rear strut and said rear leg, said bearings facilitating motion of said struts relatively to said legs.

8. The walker according to claim 7, wherein said bearings comprise linear bearings.

9. A walker for maintaining balance and stability of a user, said walker comprising:
a first leg pair;
a second leg pair;
a cross beam connecting said first and second leg pairs in parallel, space apart relation, wherein each said leg pair comprises:
a U-shaped tube defining a front leg and a rear leg;
a front strut telescopically movable within said front leg and extending outwardly therefrom;
a rear strut telescopically movable within said rear leg and extending outwardly therefrom;
a cable positioned within said tube;
a linear bearing fixedly attached to said tube, said cable engaging said linear bearing;
a first end of said cable being attached to said front strut, a second end of said cable being attached to said rear strut such that when said front strut moves into said front leg said rear strut moves outwardly from said rear leg and vice versa.

10. The walker according to claim 9, wherein said linear bearing comprises a Bowden cable, said Bowden cable comprising:
a sleeve fixedly attached to said tube;
said cable extending through said sleeve, said first end of said cable being attached to said front strut, said second end of said cable being attached to said rear strut such that when said front strut moves into said front leg said rear strut moves outwardly from said rear leg and vice versa.

11. The walker according to claim 9, wherein at least one of said leg pairs further comprises a clutch mounted thereon, said clutch being actuatable by said user to engage said cable for preventing motion of said front and said rear struts of said at least one leg pair.

12. The walker according to claim 9, wherein each said leg pair further comprises a clutch mounted thereon, said clutch being actuatable by said user to engage said cable for preventing motion of said front and said rear struts of said leg pairs.

13. The walker according to claim 9, wherein each said leg pair further comprises a cross brace extending between said front and rear legs.

14. The walker according to claim 9, wherein each said leg pair further comprises:
a front bearing acting between said front strut and said front leg; and
a rear bearing acting between said rear strut and said rear leg, said bearings facilitating motion of said struts relatively to said legs.

15. The walker according to claim 14, wherein said bearings comprise linear bearings.

* * * * *